United States Patent
Haines et al.

(10) Patent No.: US 6,310,743 B1
(45) Date of Patent: Oct. 30, 2001

(54) SEEK ACOUSTICS REDUCTION WITH MINIMIZED PERFORMANCE DEGRADATION

(75) Inventors: Jonathan W. Haines, Lafayette; Frank W. Bernett, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,416

(22) Filed: Dec. 30, 1999

Related U.S. Application Data

(60) Provisional application No. 60/140,859, filed on Jun. 24, 1999.

(51) Int. Cl.[7] ....................................................... G11B 5/55
(52) U.S. Cl. ..................................... 360/78.07; 360/78.09; 711/113; 711/133; 711/137
(58) Field of Search ....................... 360/78.04, 75, 360/78.06, 78.07, 78.09; 711/113, 133, 134, 136, 137

(56) References Cited

U.S. PATENT DOCUMENTS

| | | |
|---|---|---|
| 4,937,689 | 6/1990 | Seaver et al. . |
| 5,084,791 | 1/1992 | Thanos et al. . |
| 5,133,060 | 7/1992 | Weber et al. . |
| 5,264,771 | 11/1993 | Kawauchi . |
| 5,268,884 * | 12/1993 | Kiuchi et al. ................ 360/78.04 X |
| 5,291,110 | 3/1994 | Andrews, Jr. et al. . |
| 5,309,451 | 5/1994 | Noya et al. ........................... 711/766 |
| 5,452,440 | 9/1995 | Salsburg . |
| 5,465,034 | 11/1995 | Andrews, Jr. et al. . |
| 5,570,332 | 10/1996 | Heath et al. .................. 360/78.04 X |
| 5,657,179 | 8/1997 | McKenzie . |
| 5,668,680 | 9/1997 | Tremaine ........................... 360/78.07 |
| 5,901,009 | 5/1999 | Sri-Jayantha et al. . |
| 5,920,887 | 7/1999 | Sokolov et al. ...................... 711/113 |

FOREIGN PATENT DOCUMENTS

| | | |
|---|---|---|
| 0 687 978 A2 | 12/1995 | (EP) . |
| WO 88/02913 | 4/1988 | (WO) . |

OTHER PUBLICATIONS

"Optimizing Inactive Optical Drive Activity," IBM TDB vol. 37, pp. 435–438, Jun. 1994.*

* cited by examiner

Primary Examiner—David Hudspeth
Assistant Examiner—James L Habermehl
(74) Attorney, Agent, or Firm—Westman, Champlin & Kelly, P.A.

(57) ABSTRACT

A method of controlling an actuator in a disc drive to perform a seek operation prior to a read operation is disclosed. A radial distance between the initial track and the target track is determined. A rotational distance between the initial head rotational position and the target rotational position is also determined. The magnitude of the performance benefit to be gained by reading pre-fetch and post-fetch data is estimated. Then a seek velocity profile is selected based on the radial distance, the rotational distance and the estimated magnitude of the performance benefit that would be gained by reading pre-fetch and post-fetch data. The actuator then is controlled using the selected seek profile. A disc drive for implementing this method is also provided.

20 Claims, 3 Drawing Sheets

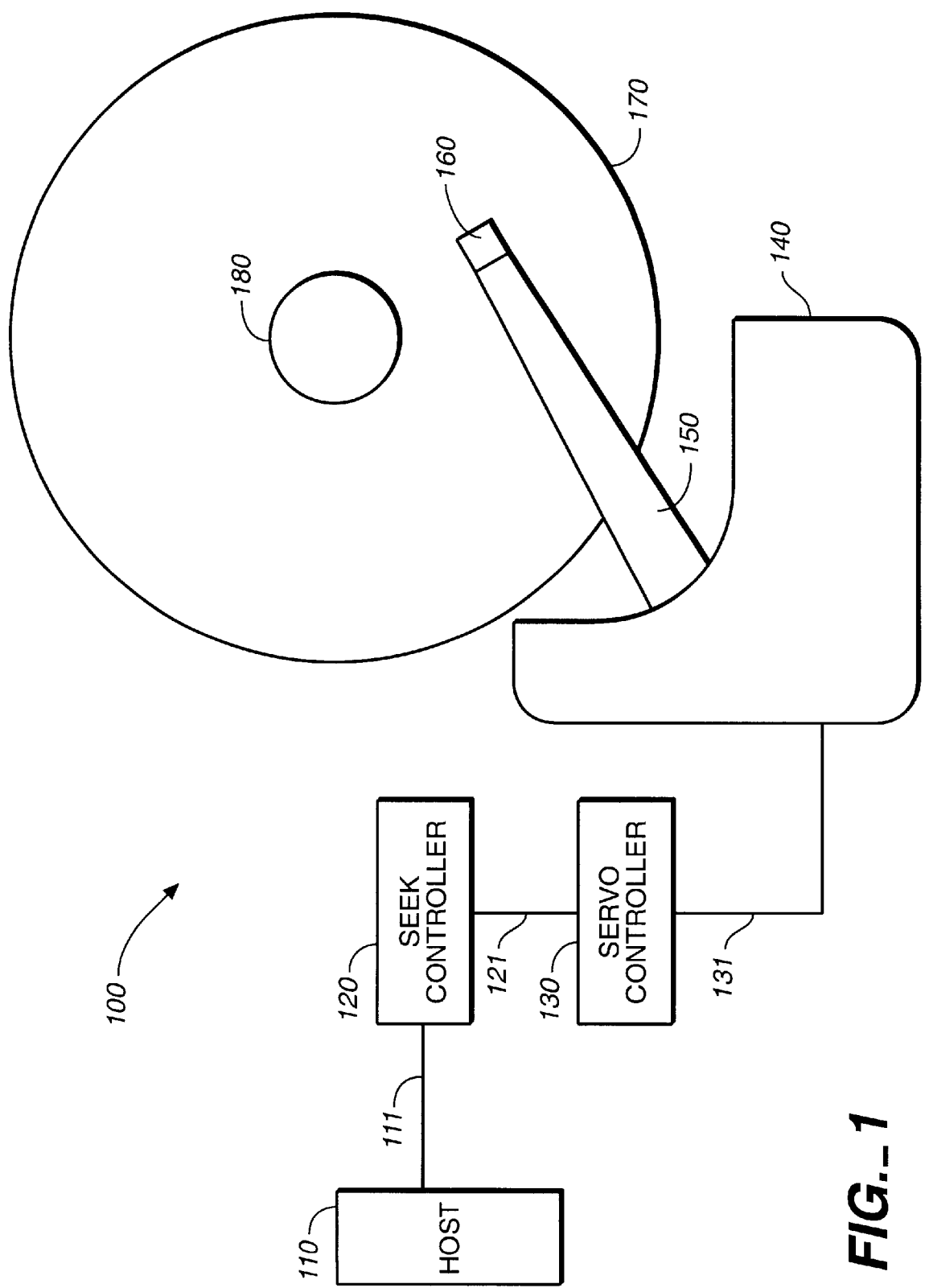
FIG._1

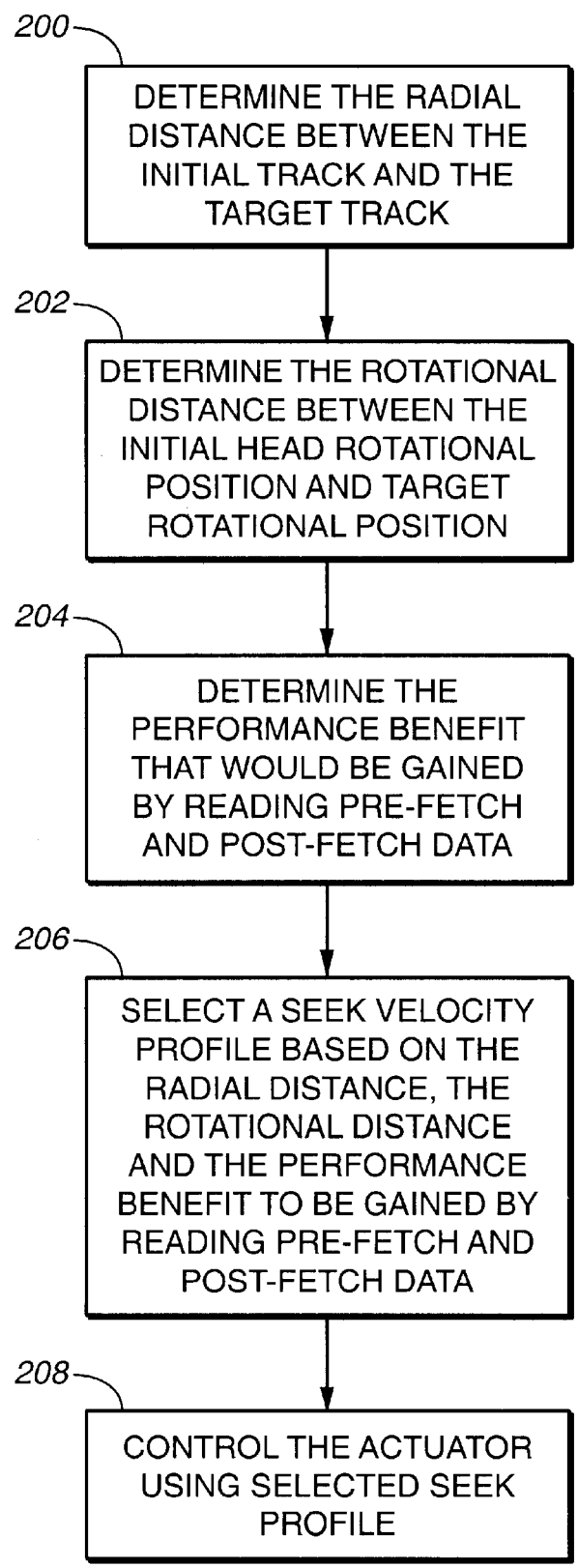
FIG._2

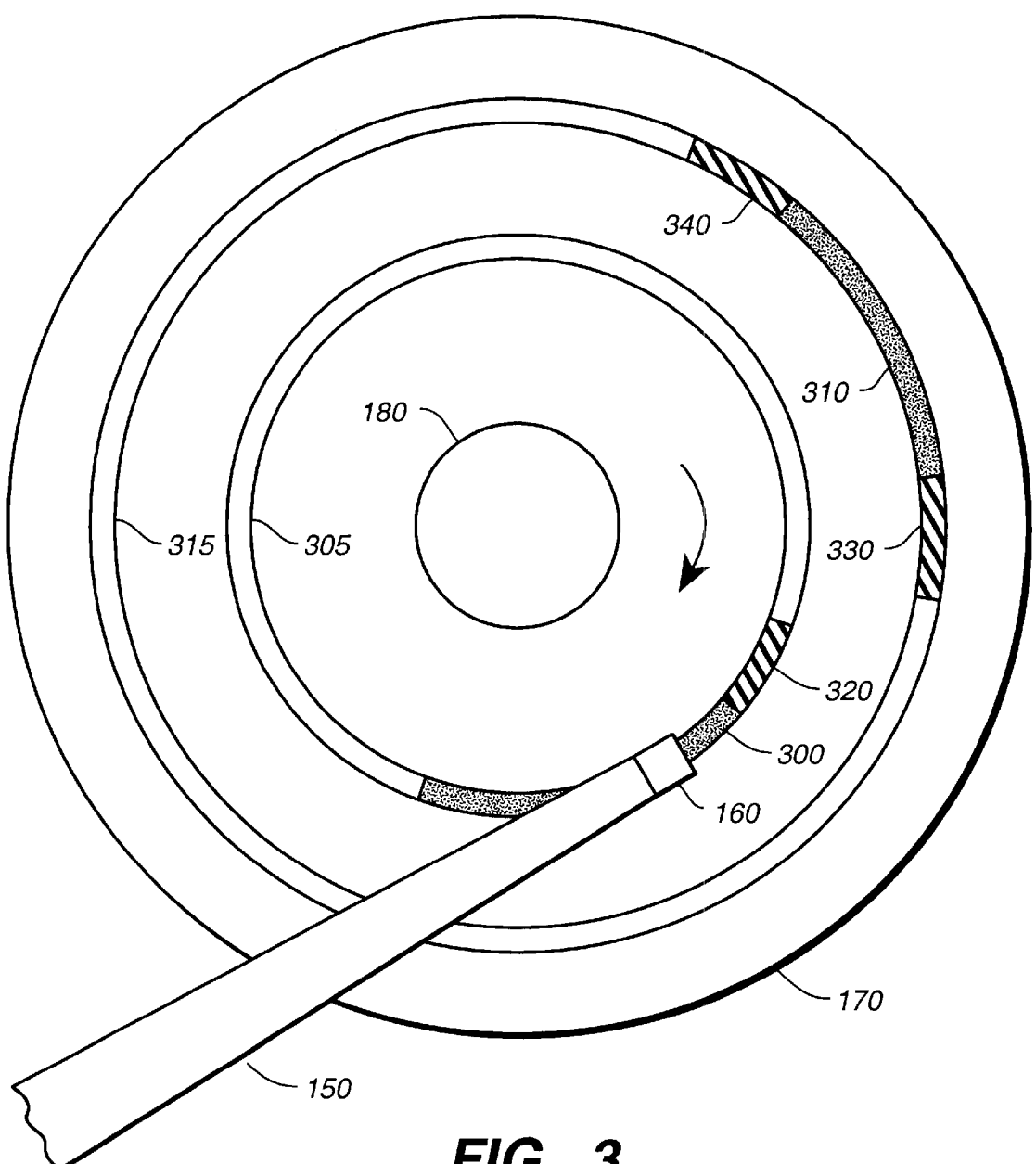
FIG._3

SEEK ACOUSTICS REDUCTION WITH MINIMIZED PERFORMANCE DEGRADATION

CROSS-REFERENCE TO RELATED APPLICATIONS

The application claims the benefit of U.S. Provisional Patent Application No. 60/140,859 entitled "SEEK ACOUSTICS REDUCTION WITH MINIMIZED PERFORMANCE DEGRADATION," filed on Jun. 24, 1999.

The following U.S. patent applications, assigned to the same assignee as the present invention, are related to the present application:

U.S. patent application Ser. No. 09/415,787 entitled "DISC DRIVE METHOD AND APPARATUS FOR DYNAMICALLY ADJUSTING SEEK OPERATIONS," filed on Oct. 8, 1999.

U.S. Provisional Patent Application No. 60/130,285 entitled "ROTATIONALLY OPTIMIZED SEEK INITIATION," filed on Apr. 21, 1999.

FIELD OF THE INVENTION

The present invention relates generally to disc drive data storage systems. More particularly, the present invention relates to methods and apparatus for performing a seek in a disc drive data storage system.

BACKGROUND OF THE INVENTION

A disc drive data storage system includes a data storage disc providing a disc surface that has concentric data tracks, a data head that can read/write to the disc surface, and an actuator which supports the data head above the disc surface. Movement of the actuator causes movement of the data head.

In disc drives, an access can be defined as the movement of the data head relative to the disc surface from the end of one read/write on the disc surface to the beginning of the next read/write on the disc surface, but not including the actual reading/writing. The access time is made up of two time components: seek time and latency time. The seek time component is the time taken to travel from the track on which one read/write completes to the track on which the next read/write begins. The second time component, the rotational latency time, includes the time the disc drive spends waiting for the appropriate data to rotate under the head after the head has arrived at the track on which the next read/write begins. The rotational latency time also includes the time the disc drive spends at a track after data has been read or written to the desired location. The rotational latency time can be a significant part of the access time for all but the longest seeks. It is the dominant component of the access time for relatively short seeks. In some disc drive data storage systems, commands sent by a host computer are executed in an optimum order to minimize both radial movement of the data head and also rotational latency.

In spite of the advantages gained by optimizing the execution of commands, lack of control over the number and size of commands and the time between commands arriving from the host computer imposes limitations in the optimization techniques. Thus, significant rotational latency still exists in current systems.

Access operations are typically a combination of rapid movement of the actuator that moves the data head to the desired track followed by a wait period for the appropriate data to come under the head. Rapid movement of the actuator causes problems in the disc drive data storage systems such as increased vibration, an increase of emitted acoustics, high power consumption, and generally a higher stress factor to the overall mechanics.

When performing read seeks, pre-fetch or post-fetch data can be obtained from the target data track during the latency period before the desired data rotates beneath the head and after the desired data is read. Accessing the pre-fetch and post-fetch data improves the drive performance, but results in increased acoustic noise due to the relatively high velocity of the seek required to arrive at the target track soon enough to read the pre-fetch data. Conventional just-in-time seeking, in contrast, calls for seek operations to be performed at the slowest possible velocity which allows the head to arrive at the data to be read by the time that location rotates beneath the head. This reduces the level of acoustic noise, but ignores the potential efficiency gains attainable by reading pre-fetch or post-fetch data in the same fetch operation as that of the target data.

The present invention provides a solution to this and other problems and offers other advantages over the prior art.

SUMMARY OF THE INVENTION

The present invention relates to disc drive data storage systems which reduce vibrations, acoustic noise and/or power consumption while minimizing performance degradation.

One embodiment of the present invention is directed to a method of controlling an actuator in a disc drive to perform a seek operation prior to a read operation. An indicator of the performance benefit to be gained by reading pre-fetch or post-fetch data is determined. Then a seek velocity profile is selected based on the indicator of the performance benefit that would be gained by reading pre-fetch and post-fetch data. The actuator then is controlled using the selected seek profile.

In one embodiment, prior to selecting a seek profile, the radial distance between the initial track and the target track is determined. A rotational distance between the initial head rotational position and the target rotational position is also determined. Then a seek velocity profile is selected based on the indicator of the performance benefit, the radial distance and the rotational distance.

In one embodiment, the indicator of the performance benefit that would be gained by reading pre-fetch and post-fetch data is derived in part from the radial seek length.

Another embodiment of the invention is directed to a disc drive data storage system having a data storage disc, a data head, an actuator and a controller. The data storage disc provides a disc surface. The data head is capable of reading data from the disc surface. The actuator supports the data head above the disc surface so that movement of the actuator causes movement of the data head. The controller controls the actuator to move the data head to a target location to implement a read operation in response to a request from a host. The controller is capable of generating an indicator of the magnitude of the performance benefit that would be gained by reading post-fetch data on the initial track prior to commencing the seek and by reading pre-fetch data on the target track after the seek and prior to reading the requested data. The controller is also capable of selecting a seek velocity profile for a read seek operation based on seek length and the indicator of the magnitude of the performance benefit that would be gained by reading pre-fetch or post-etch data.

These and various other features as well as advantages which characterize the present invention will be apparent upon reading of the following detailed description and review of the associated drawings.

BRIEF DESCRIPTION OF THE DRAWINGS

FIG. 1 is a simplified diagram of a disc drive data storage system that performs a seek in accordance with the present invention.

FIG. 2 is a flow chart of a method of implementing a seek operation in accordance with the present invention.

FIG. 3 is a top view of a disc demonstrating the reading of pre-fetch and post-fetch data.

DETAILED DESCRIPTION OF ILLUSTRATIVE EMBODIMENTS

An illustrative embodiment of a disc drive data storage system that performs a seek in accordance with the present invention is shown in FIG. 1. Disc drive data storage system 100 includes seek controller 120, servo controller 130, actuator motor 140, actuator 150, data head 160, disc 170 and spindle 180. Disc drive data storage system 100 is coupled to a host computer 110 that sends commands 111 to seek controller 120. Seek controller 120 optimizes the seek operations corresponding to these commands. The seek controller 120 accordingly sends seek implementation instructions 121 to servo controller 130. Velocity and acceleration control instructions 131 are in turn sent by servo controller 130 to actuator motor 140. Actuator 150 is moved in different directions over the surface of magnetic disc 170 by means of actuator motor 140. Magnetic disc 170 rotates about an axis of spindle 180 which is driven by a motor (not shown). Data head 160 that is supported by actuator 150 reads data from and/or writes data to the disc surface in accordance with the command associated with the optimized seek operation implemented by the actuator motor and by the controllers.

Seek controller 120 and servo controller 130 can each be implemented by separate microprocessors or digital signal processors, or can also be included in the same microprocessor or digital signal processor. Servo controller 130 functions in conformance with instructions it receives from seek controller 120.

In embodiments of the invention, seek controller 120 needs information that includes a rotational position of data head 160 when the access will start and a rotational position of data head 160 at a destination of the access to determine an optimum seek profile for the seek operation. A method that illustrates obtaining and using this information to implement the seek portion of the access is described below.

FIG. 2 is a flow chart representing a method, comprising steps 200 through 208, of implementing a seek operation in accordance with the present invention. At step 200, the radial distance between the initial track and the target track is determined. At step 202, a rotational distance between the initial head rotational position and the target rotational position is determined. At step 204, an indicator of the performance benefit to be gained by reading pre-fetch and/or post-fetch data is derived. As used in this application, "performance benefit" refers to an increase in the overall data transfer rate of the disc drive. At step 206, a seek velocity profile is selected based on the radial distance, the rotational distance and the performance benefit indicator. At step 208, the actuator 150 then is controlled using the selected seek profile.

FIG. 3 is a top view of a disc 170 demonstrating the reading of pre-fetch and post-fetch data. Post-fetch data is data that is rotationally adjacent to data that is requested by the host computer 110 and that is read from the track after the head 160 reads the requested data. For example, FIG. 3 shows two blocks of data 300 and 310, residing on tracks 305 and 315 respectively, that are requested by the host 110. For ease of;. illustration, both requested data segments 300 and 310 and pre-fetch/post-fetch data 320, 330 and 340 are exemplified on only one surface of one disc, in a circular-track configuration. However, it should be noted that requested data segments 300 and 310 and pre-fetch/post-fetch data 320, 330 and 340 may also reside on different disc surfaces in accordance with the present invention. In the illustrative disc access represented in FIG. 3, data block 300 is accessed first and data block 310 second. Disc 170 is rotating in a clockwise direction, as shown. After the requested data 300 is read from track 305, rather than immediately leave track 305 to seek to the location of the next data 310 requested by the host 110, the head 160 remains on track 305 for a period of time and reads the data 320 that rotates beneath the head 160 after the head 160 finishes reading the requested data 300. This data 320 is referred to as the post-fetch data.

Pre-fetch data is data 330 that is rotationally adjacent to data 310 that is requested by the host computer 110 and that is read from the destination track 310 before the head 160 reads the requested data 310. In order to read pre-fetch data 330, the data head 160 must arrive at track 315, which contains the requested data 310, prior to the point in time that the rotational location of the requested data 310 rotates beneath the data head 160. The earlier the head 160 arrives at track 315, the more pre-fetch data 330 can be obtained. FIG. 3 also shows data 340 on track 315 which could be obtained as post-fetch data after head 160 retrieves the requested data 310. It should be noted that although requested data blocks 300 and 310 are shown in FIG. 3 as residing on the same disc surface 170, they may, in accordance with the present invention reside on different disc surfaces.

Any pre-fetch or post-fetch data obtained is stored in temporary memory such as a cache or a buffer. Then if that data is requested by the host 110, it can be accessed from the cache rather than by implementing a time-consuming disc access. In this way, obtaining pre-fetch and post-fetch data increases drive performance, i.e., the overall data transfer rate. However, because reading pre-fetch and post-fetch data requires the head to spend more time on the data tracks, this leaves less time for seek operations, which in turn requires faster seek operations. High seek velocities result in a high level of acoustic noise.

A "just-in-time" seek is a seek which arrives at the track containing the data to be read just prior to the point in time that the rotational location of the requested data rotates beneath the data head 160. Thus, referring to FIG. 3, a just-in-time seek employs the slowest seek profile that will place the head 160 at the target track 315 in time to read the requested data 310, without having to wait through an additional revolution of the disc 170. Because of the relative slowness of just-in-time seeks, they produce relatively less acoustic noise. However, pre-fetch and post-fetch data cannot be obtained when a just-in-time seek is employed. Therefore, just-in-time seeks result in reduced performance of the disc drive 100.

The degree to which reading and caching pre-fetch and/or post-fetch data will improve the performance of the disc drive varies according to a number of factors. According to step 206 in FIG. 2, the selection of the seek velocity profile is based in part on an indicator of the degree to which reading pre-fetch and post-fetch data will improve the performance of the drive 100. If reading pre-fetch and/or post-fetch data is likely to greatly improve the performance of the drive 100, this weighs towards using a relatively fast seek so that more pre-fetch and post-fetch data can be obtained. On the other hand, if reading pre-fetch and/or post-fetch data is not likely to greatly improve the performance of the drive 100, this weighs towards using a relatively slower seek so that less acoustic noise will be produced. Step 204 of FIG. 2 calls for generating an indicator of the magnitude of the performance benefit to be gained from obtaining pre-fetch or post-fetch data. The magnitude of the performance benefit is in part dependent upon the probability that the pre-fetch or post-fetch data will be requested by the host 110 in the near future. In other terms, the magnitude is in part dependent on the probability that the pre-fetch or post-fetch data will be requested by the host 110 within a given number of disc access operations. This is because the caching of pre-fetch and post-fetch data has no value if the cached data is not accessed by the host 110 at some later point in time. Pre-fetch and post-fetch data is more likely to be requested by the host 110 in the near future if the associated seek operation is of a relatively short distance. This is because related data blocks tend to be stored in relatively close proximity on the disc surface 170. Thus, in an illustrative embodiment of the present invention, the estimate of the magnitude of the performance benefit that would be gained by reading pre-fetch and post-fetch data is based partly on the distance of the seek. Longer seeks give rise to relatively lower performance benefit estimates and shorter seeks give rise to relatively higher performance benefit estimates.

The value of reading pre-fetch and post-fetch data is also dependent upon the availability of the cache. If the cache is full, pre-fetch and post-fetch data have less value, since some cached data must be discarded to make room for new data. Furthermore, the value of caching pre-fetch and post-fetch data varies according to how full or empty the cache is. If the cache is almost full, caching pre-fetch or post-fetch data will bring the cache closer to capacity. This may prevent or limit the caching of valuable pre-fetch and post-fetch data in the future. If, on the other hand, the cache is relatively less full, caching pre-fetch or post-fetch data will not significantly limit the caching of pre-fetch or post-fetch data in the future. Also, if the cache is almost full, and there is not enough memory available to store all of the pre-fetch or post-fetch data for a given seek, the pre-fetch and post-fetch data has reduced value. Thus, according to an illustrative embodiment of the present invention, the indicator of the value of obtaining pre-fetch or post-fetch data is varied according to how full or empty the cache is. Thus, a slower seek, preferably a just-in-time seek, will be performed if the cache is full. If the cache is relatively empty, the estimate of the value of obtaining pre-fetch or post-fetch data is increased, which then results in a relatively faster seek. Conversely, if the cache is nearly full, the estimate of the value of obtaining pre-fetch or post-fetch data is decreased, which results in a relatively slower seek. In one illustrative embodiment, the indicator of the magnitude of the performance benefit is decreased if the cache is at least 90% full.

In another illustrative embodiment, the estimate of the value of obtaining pre-fetch or post-fetch data is varied according to the type of access being performed. For example, if a sequential access is being performed, the estimate of the value of obtaining pre-fetch or post-fetch data is increased. This is because when a sequential access is being performed, the chances of the adjacent data being requested in the near future go up. If a sequential access is being performed and an entire track or cylinder of data is read and data was pre-fetched on the track or cylinder, the data that was pre-fetched and stored in the cache can be retrieved from the cache rather than reading that data again at the end of the disc read operation. This frees up the actuator arm 150 to seek to the next data location.

Referring now to step 206 of FIG. 2, in general, longer seeks produce more acoustic noise than shorter seeks. This is because longer seeks require a higher degree of acceleration over a longer period of time, which in turn requires the actuator motor 140 to produce more torque. But short seeks are performed significantly more often than long seeks. Thus, in step 206 of FIG. 2, the seek velocity profile is selected based in part on the radial and rotational length of the seek. In an illustrative embodiment of the present invention, a relatively greater seek distance weighs towards a slower seek profile, while a relatively short seek distance weighs towards a faster seek profile. In this way, the acoustic noise produced by the loudest seeks, those of the greatest length, is significantly reduced. Because long seeks are much less prevalent than short seeks, slowing down the long seeks does not have a significant impact on the performance of the drive 100. At the same time, the performance of the drive 100 during the vast majority of seek operations, the relatively shorter seeks, is maintained at a high level. Performing high speed seeks over short distances does not produce a significant amount of acoustic noise since short seeks do not produce as much noise as longer seeks.

According to an illustrative embodiment of the present invention, a just-in-time seek will be performed if the radial seek distance is greater than a predetermined threshold distance, or if the cache is full or almost full. For example, in an illustrative embodiment, if the radial seek distance is greater than 0.5 inches (currently about 10,000 data tracks), a just-in-time seek will be employed. In an illustrative embodiment of the present invention, to perform a just-in-time seek, first an access time required to move the data head from the initial rotational position on the initial track to the target rotational position on the target track using a fastest of a plurality of seek profiles is determined. Then the slowest of the plurality of seek profiles which can be used to move the data head from the initial rotational position on the initial track to the target track in less than the determined access time is selected and implemented. In other words, the slowest seek profile which will get the head to the target location in time to read the requested data, without requiring an unnecessary revolution of the disc, will be used. Just-in-time seek methods are described in detail in U.S. patent application Ser. No. 09/415,787 entitled "DISC DRIVE METHOD AND APPARATUS FOR DYNAMICALLY ADJUSTING SEEK OPERATIONS," filed on Oct. 8, 1999, and assigned to the same entity as the present application.

In a further illustrative embodiment of the present invention, if the radial seek distance is less than a predetermined threshold distance, a seek will be performed which places the heads at the target track before the arrival of the requested data, or which allows the heads to remain at the initial track after the requested data is read from the initial track prior to commencing the seek, or both. This allows the head to obtain pre-fetch or post-fetch data. In an illustrative embodiment, to perform such a seek, first an access time required to move the data head from the initial rotational position on the initial track to the target rotational position on the target track using a fastest of a plurality of seek profiles is determined. Then a seek profile is selected which moves the data head from the initial rotational position on the initial track to the target track in less than the determined access time, so that pre-fetch or post-fetch data can be obtained.

According to an illustrative embodiment of the present invention, the seek velocity profile is based partly on the rotational distance of the seek, as indicated by step 206 in FIG. 2. The rotational distance must be considered in order to ascertain whether the head 160 can reach the target location 310 at all within a given number of disc revolutions. Take, for example, a disc drive having a disc rotational period of 10 ms. If the shortest time in which a given radial seek could be performed (which is generally proportional to radial seek distance) is 15 ms (milliseconds), and the rotational time it takes the requested data 310 to rotate beneath the head (which is proportional to rotational seek distance) is 4 ms, performing the fastest seek possible (15 ms) would result in the head 160 just missing the data (at 4+10=14 ms). Thus, it may not be desirable to perform such a fast seek as it would result in more acoustic noise. In this situation, the head 160 would be controlled to reach the requested data 310 on the next revolution, at 24 ms (4+10+10). The decision of how far in advance of the requested data 310 the head 160 should arrive at the target track 315 on that next revolution will be based upon the radial distance of the seek and the expected benefit of obtaining pre-fetch 330 and/or post-fetch 320 data.

In contrast to the above example, suppose a seek of the same radial distance (15 ms) but of a rotational distance of 6 ms is to be performed on the same drive. In this case, performing the fastest seek possible (15 ms) would put the head 160 at the target track 1 ms before the arrival of the requested data (at 6+10=16 ms). In this situation, a seek of no slower than 16 ms will be performed because waiting another revolution to access the requested data 310 results in a significant decrease in performance. The decision of how far in advance of the requested data 310 the head 160 should arrive at the target track 315 will be based upon the radial distance of the seek and the expected benefit of obtaining pre-fetch 330 and/or post-fetch 320 data. Of course, in this case, the earliest the head 160 could arrive at the target track 315 would be 1 ms ahead of the requested data 310.

In an illustrative embodiment of the present invention, shorter seeks will be slowed down somewhat if the amount of pre-fetch or post-fetch data that can be obtained in spite of the slowdown is sufficient to maintain the performance of the drive at a desired level.

In summary, one embodiment of the present invention is directed to a method of controlling an actuator 150 in a disc drive 100 to perform a seek operation prior to a read operation. A radial distance between the initial track and the target track is determined. A rotational distance between the initial head rotational position and the target rotational position is also determined. An indicator of the performance benefit to be gained by reading pre-fetch or post-fetch data is derived. Then a seek velocity profile is selected based on the radial distance, the rotational distance and the estimated magnitude of the performance benefit that would be gained by reading pre-fetch and post-fetch data. The actuator 150 then is controlled using the selected seek profile.

Another embodiment of the invention is directed to a disc drive data storage system 100 having a data storage disc 170, a data head 160, an actuator 150 and a controller 120, 130. The data storage disc 170 provides a disc surface. The data head 160 is capable of reading data from the disc surface. The actuator 150 supports the data head 160 above the disc surface so that movement of the actuator 150 causes movement of the data head 160. The controller 120, 130 controls the actuator 150 to move the data head 160 to a target location to implement a read operation in response to a request from a host 110. The controller 120, 130 is capable of estimating the magnitude of the performance benefit that would be gained by reading post-fetch data on the initial track prior to commencing the seek and/or by reading pre-fetch data on the target track after the seek and prior to reading the requested data. The controller 120, 130 is also capable of selecting a seek velocity profile for a read seek operation based on a radial distance between the initial track and the target track, a rotational distance between the initial head rotational position and the target rotational position, and the estimated magnitude of the performance benefit that would be gained by reading pre-fetch and/or post-fetch data.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, while the pre-fetch and post-fetch data is described as being stored in a cache, other data storage means may also be employed to store the pre-fetch and post-fetch data. Other modifications can also be made.

What is claimed is:

1. A method of controlling an actuator in a disc drive to seek a data head from an initial track to a target track storing data requested by a host, the method comprising steps of:

(a) selecting a seek velocity profile based on an indicator of the performance benefit that would be gained by reading data that is additional to the requested data without additions seeks; and (b) controlling the actuator using the selected seek profile.

2. The method of claim 1 further comprising a step (c), prior to selecting step (a), of determining a radial distance between the initial track and the target track, and a step (d), prior to selecting step (a), of determining a rotational distance between an initial head rotational position and a target rotational position on the target track storing data requested by the host, and wherein selecting step (a) comprises selecting a seek velocity profile based on the indicator, the radial distance, and the rotational distance.

3. The method of claim 2 wherein selecting step (a) comprises steps of:

(a)(i) selecting a relatively fast seek profile for seeks of relatively short radial distance; and (a)(ii) selecting a relatively slower seek profile for seeks of relatively greater radial distance.

4. The method of claim 3 wherein selecting step (a)(i) comprises steps of:

(a)(i)(A) determining an access time required to move the data head from the initial rotational position on the initial track to the target rotational position on the target track using a fastest of a plurality of seek profiles; and (a)(i)(B) selecting a seek profile which moves the data head from the initial rotational position on the initial track to the target track in less than the determined access time, such that data that is rotationally adjacent to the requested data can be read by the data head.

5. The method of claim 3 wherein selecting step (a)(ii) comprises steps of:

(a)(ii)(A) determining an access time required to move the data head from the initial rotational position on the initial track to the target rotational position on the target track using a fastest of a plurality of seek profiles;

(a)(ii)(B) selecting a slowest of the plurality of seek profiles which can be used to move the data head from the initial rotational position on the initial track to the target rotational position on the target track within the determined access time.

6. The method of claim 3 wherein selecting step (a)(i) comprises selecting a first seek profile for seeks of a radial distance that is less than a predetermined threshold and wherein selecting step (a)(ii) comprises selecting a second seek profile, slower than the first seek profile, for seeks of a radial distance that is greater than the predetermined threshold.

7. The method of claim 1 wherein selecting step (a) comprises determining a probability that the additional data will be requested by the host in the near future.

8. The method of claim 1 wherein selecting step (a) comprises determining a probability that the rotationally adjacent data will be requested by the host within a predetermined number of disc access operations.

9. The method of claim 1 wherein selecting step (a) comprises varying the indicator according to the radial distance of the seek, wherein a relatively high magnitude is estimated for relatively shorter radial seek distances and a relatively lower magnitude is estimated for relatively longer radial seek distances.

10. The method of claim 1 wherein the disc drive includes a cache memory for temporarily storing the rotationally adjacent data and wherein selecting step (a) comprises decreasing the indicator if the cache memory is at least 90% full.

11. The method of claim 1 wherein selecting step (a) comprises weighing the radial distance and the indicator of the performance benefit that would be gained by reading additional data, wherein a relatively longer radial distance weighs toward a relatively slower seek profile and a relatively shorter radial distance weighs toward a relatively faster seek profile, and wherein a relatively lower indicator weighs toward a relatively slower seek profile and a relatively higher indicator weighs toward a relatively faster seek profile.

12. A disc drive data storage system comprising:
a data storage disc providing a disc surface;
a data head adapted to read data from the disc surface;
an actuator which supports the data head above the disc surface such that movement of the actuator causes movement of the data head; and
a controller adapted to control the actuator to seek the data head from an initial track to a target track storing data requested by a host, wherein the controller is adapted to estimate a magnitude of a performance benefit that would be gained by reading data that is rotationally adjacent to the requested data, and wherein the controller is further adapted to select a seek velocity profile for a read seek operation based on a radial distance between an initial track and a target track, a rotational distance between an initial head rotational position and a target rotational position, and the estimated magnitude of the performance benefit that would be gained by reading the rotationally adjacent data.

13. The disc drive of claim 12 wherein the controller is adapted to estimate a likelihood that the rotationally adjacent data will be requested by the host in the near future.

14. The disc drive of claim 12 wherein the controller is adapted to vary the estimate of the magnitude of the performance benefit according to the radial distance of the seek, wherein a relatively high magnitude is estimated for relatively shorter radial seek distances and a relatively lower magnitude is estimated for relatively longer radial seek distances.

15. The method of claim 12 wherein the disc drive further includes a cache memory for temporarily storing the rotationally adjacent data and wherein the controller is adapted to decrease the estimate of the magnitude of the performance benefit if the cache memory is full or nearly full.

16. The disc drive of claim 12 wherein the controller is adapted to select a relatively fast seek profile for seeks of relatively short radial distance and wherein the controller is adapted to select a relatively slower seek profile for seeks of relatively greater radial distance.

17. The disc drive of claim 16 wherein the controller is adapted to determine an access time required to move the data head from the initial rotational position on the initial track to the target rotational position on the target track using a fastest of a plurality of seek profiles and wherein, for seeks of relatively short radial distance, the controller is adapted to select a seek profile which moves the data head from the initial rotational position on the initial track to the target track in less than the determined access time, such that rotationally adjacent data can be read by the data head.

18. The disc drive of claim 16 wherein the controller is adapted to determine an access time required to move the data head from the initial rotational position on the initial track to the target rotational position on the target track using a fastest of a plurality of seek profiles and wherein, for seeks of relatively greater radial distance, the controller is adapted to select a slowest of the plurality of seek profiles which can be used to move the data head from the initial rotational position on the initial track to the target rotational position on the target track within the determined access time.

19. The disc drive of claim 16 wherein the controller is adapted to select a first seek profile for seeks of a radial distance that is less than a predetermined threshold and wherein the controller is adapted to select a second seek profile, slower than the first seek profile, for seeks of a radial distance that is greater than the predetermined threshold.

20. A disc drive comprising:
a disc providing a disc surface; and
means for controlling an actuator to move a data head over the disc surface to implement a read operation.

* * * * *